INVENTORS.
Berg Bach,
George C. Susong and
Robert W. Harrold

BY Lockwood, Woodard, Smith & Weikart
Attorneys

Aug. 22, 1967 B. BACH ETAL 3,336,954
WIRE CUTTING AND FORMING DEVICE
Filed April 28, 1965 3 Sheets-Sheet 2
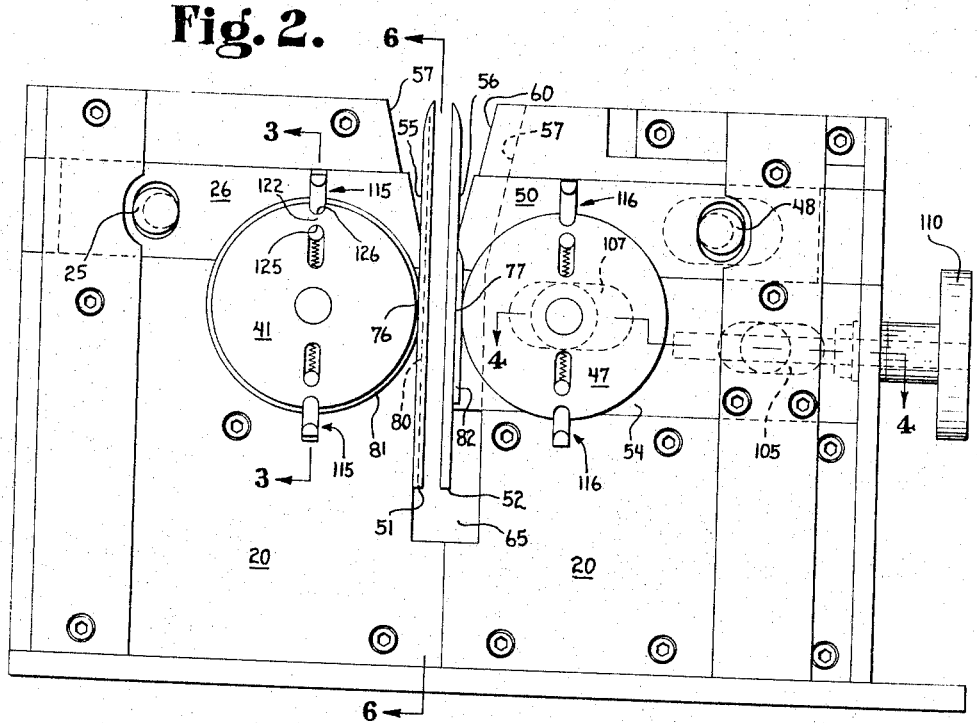
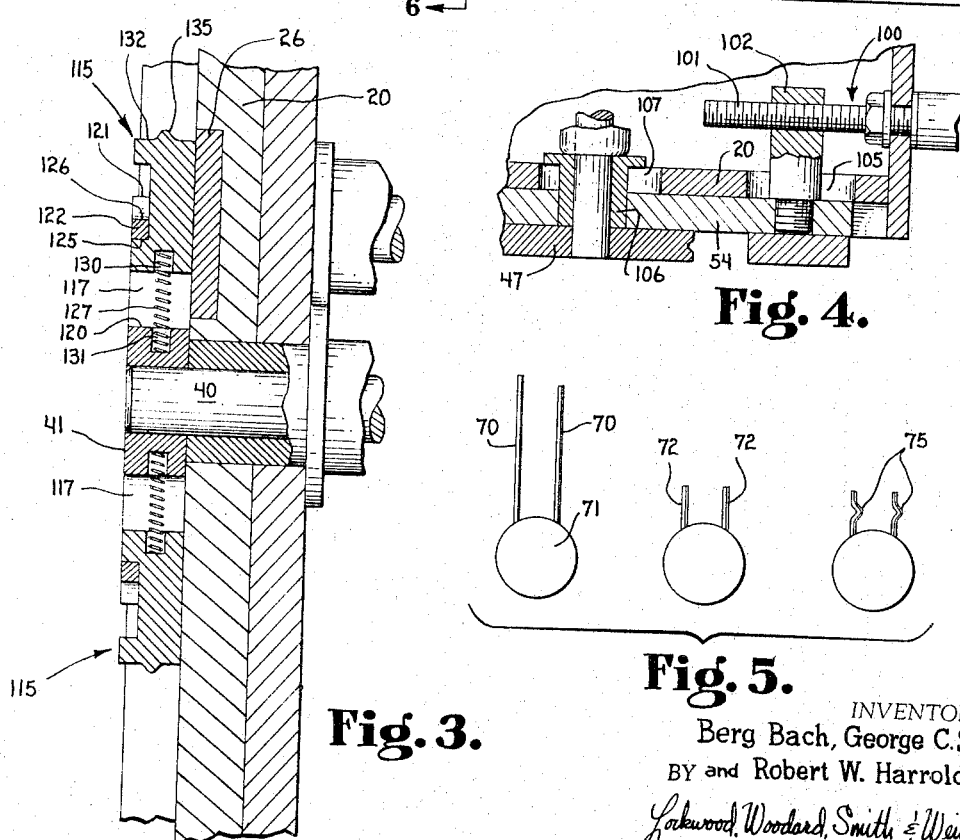
INVENTORS.
Berg Bach, George C. Susong
BY and Robert W. Harrold
Lockwood, Woodard, Smith & Weikart
Attorneys INVENTORS.
Berg Bach, George C. Susong
and Robert W. Harrold

United States Patent Office 3,336,954
Patented Aug. 22, 1967

3,336,954
WIRE CUTTING AND FORMING DEVICE
Berg Bach, Jefferson City, and George C. Susong and Robert W. Harrold, Morristown, Tenn., assignors to The Magnavox Company, Fort Wayne, Ind., a corporation of Delaware
Filed Apr. 28, 1965, Ser. No. 451,594
5 Claims. (Cl. 140—105)

ABSTRACT OF THE DISCLOSURE

A frame with a pair of horizontally spaced upstanding anvils including shearing edges, a pair of horizontally reciprocable cutting blades cooperable with said edges, a pair of forming wheels rotatable on horizontal axes and associated with forming portions of said anvils and having radially slidable lugs for engaging lead wires of a capacitor after shearing and urging them between said wheels and anvils for forming the leads, the spacing between anvils being adjustable to wire spacing.

Background and description

This invention relates to apparatus for forming component lead wires into a predetermined shape.

With the increased use of printed circuits, the necessity of reliably and uniformly mounting large numbers of electrical components such as capacitors and resistors to printed circuit boards is of very considerable importance. In certain applications, it is very desirable that the lead wires be formed to a carefully chosen predetermined shape and length. For example, the wires may be provided with curves therein which project toward one another, away from one another or both in the same direction. Accordingly, it is a primary object of the present invention to provide improved apparatus for forming component lead wires to proper length and shape.

Another object of the invention is to provide an apparatus of the present nature capable of both cutting and forming.

Related objects and advantages will become apparent as the description proceeds.

One embodiment of the present invention comprises an apparatus for forming and trimming the projecting wires of electrical components, said apparatus comprising a frame having a vertically extending slot which diverges and opens at the top of said frame, a pair of anvils mounted on said frame and each including a shear blade portion, a pair of cutting blades mounted on said frame for horizontal movement inwardly toward and past the diverging portions of said slot and said anvils for shearing cooperation with said anvils, a pair of wheels each rotatably mounted on said frame on opposite sides of said slot with each wheel adjacent a respective one of said anvils, each of said anvils having an outwardly facing forming face shaped to cooperate with a respective wheel, said forming faces being located below said cutting blades, fingers reciprocably mounted on said wheels and spring pressed radially outwardly beyond the peripheries of said wheels, means for actuating said blades to simultaneously move inwardly to trim off the ends of projecting wires, and means for rotating said wheels to cause said fingers to engage the wires and force them between the wheels and anvils.

The full nature of the invention will be understood from the accompanying drawings and the following description and claims.

FIG. 2 is a front elevation of the apparatus of FIG. 1;

FIG. 3 is an enlarged vertical section taken along the line 3—3 of FIG. 2 in the direction of the arrows;

FIG. 4 is an enlarged horizontal section taken along the line 4—4 of FIG. 2 in the direction of the arrows;

FIG. 5 is a composite of three views showing the serial steps of forming the product in the operation of the present apparatus;

Figure 1:
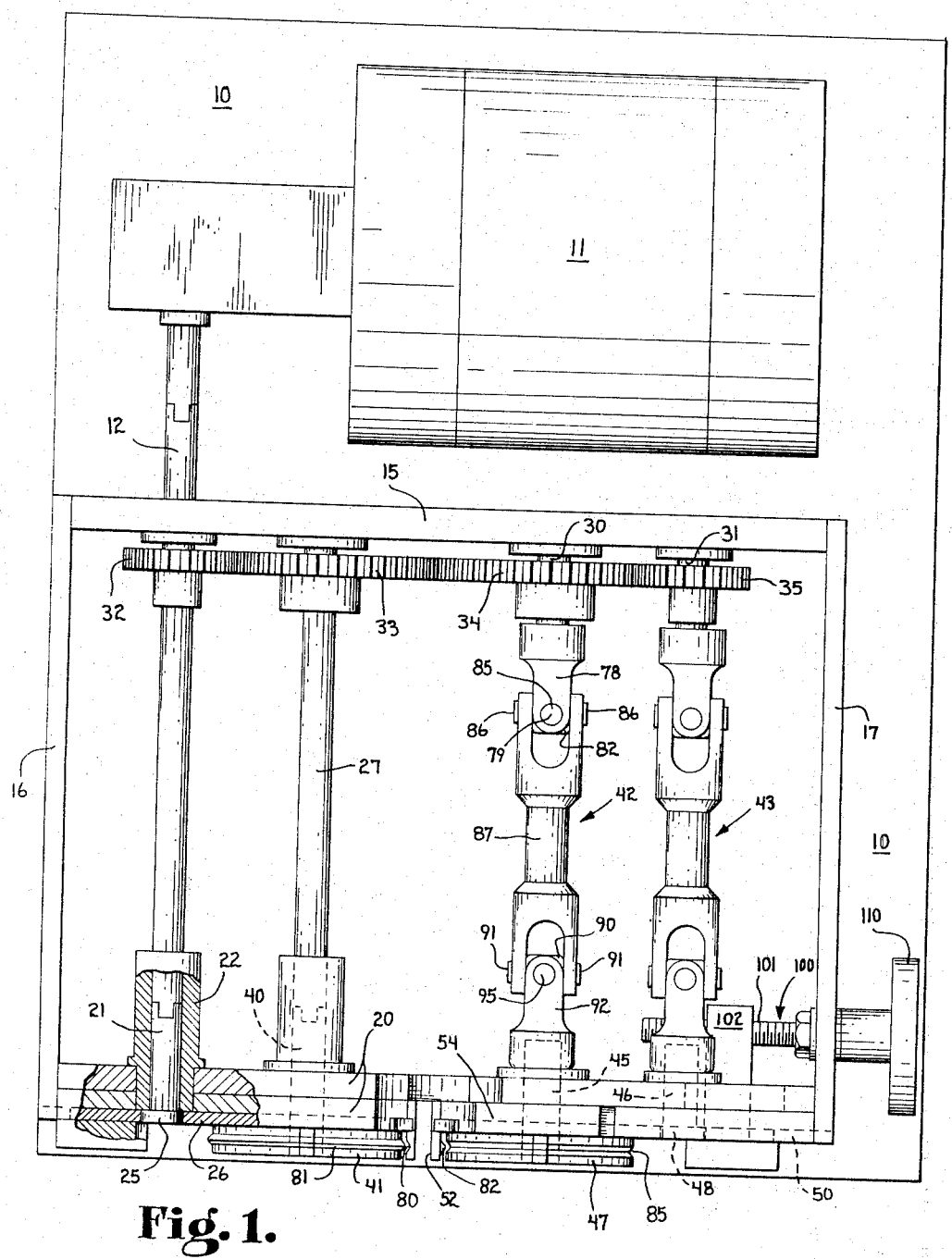
FIG. 1 is a top plan view of an apparatus constructed according to the present invention.
Figure 6:
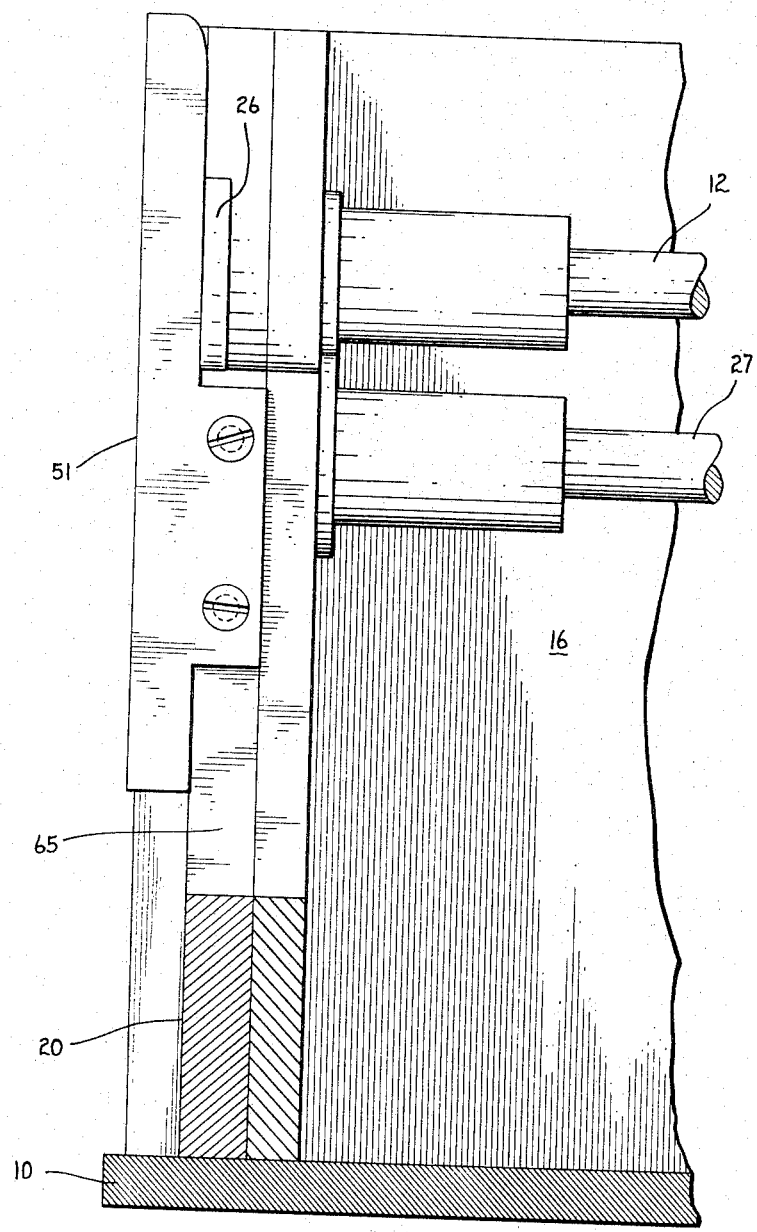
FIG. 6 is an enlarged vertical section taken along the line 6—6 of FIG. 2 in the direction of the arrows.

Referring now more particularly to the drawings, there is illustrated an apparatus for cutting and notching the lead wires of capacitors. This apparatus includes a base 10 upon which is mounted a drive motor 11. The drive motor 11 is operatively coupled to a shaft 12 which is journalled within a vertical back plate 15 which together with vertical side plates 16 and 17, base 10 and two-ply front plates 20 make up a rigid frame for the apparatus. The shaft 12 has a continuation 21 connected to the end thereof, said shaft and continuation being journalled in bearing 22 which is fixed to the front plates 20. Formed integrally with the forward end of the shaft 21 is an eccentrically located cylinder 25 which operates to reciprocate cutter blade 26.

A further plurality of shafts 27, 30 and 31 are also journalled in the back plate 15 and are operatively connected for positive rotation relative to one another by spur gears 32, 33, 34 and 35. The shaft 27 is fixedly connected to a shaft 40 which has secured to its forward end a forming wheel 41. The shafts 30 and 31 each are provided with a universal joint arrangement 42 and 43 which couples the shafts 30 and 31 to further shafts 45 and 46. The shaft 45 has secured to its forward end the forming wheel 47 while the shaft 46 has at its forward end an integral eccentrically positioned cylinder 48 which operates to reciprocate cutter blade 50.

Referring to both FIGS. 1 and 2, a pair of anvils 51 and 52 are fixedly mounted upon the front plate 20 and upon a horizontally adjustable anvil support 54. The anvils 51 and 52 have surfaces 55 and 56 which cooperate with the blades 26 and 50 in shear to trim off the leads of the capacitor. It will be noted that the upper portion of the frame 20 slopes at 57 while the upper portion of the adjustable support 54 also slopes at 60. Thus, the support 54 and the frame 20 define a slot 65 which extends vertically and includes the diverging surfaces 57 and 60 and which also opens upwardly of the apparatus. It is this slot 65 that is used to receive the wires 70 projecting from the capacitor 71 of FIG. 5. The present apparatus operates to first cut off the wires to the length shown at 72 and to then form or notch the wires in a desired manner as shown at 75.

The notching operation is accomplished by means of the portions 76 and 77 of the anvils 51 and 52, respectively, said anvils cooperating with the wheels 41 and 47 to accomplish the notching operation. As is best seen in FIG. 1, the anvil 51 has a vertically extending recess 80 in its outwardly facing surface, this recess cooperating with the projection 81 on the periphery of the wheel 41 to make the notch. The anvil 52 has a projection 82 on its outwardly facing surface which cooperates with the recess 85 in the outer surface of the wheel 47 to form a notch or bend in the wire. It can be appreciated that the wheels 41 and 47 and anvils 51 and 52 can be removed and replaced with other anvils which will cause the notches to form curves projecting toward one another, away from one another or in the same direction. For example, the wheel 41 and anvil 51 might be removed and replaced by a wheel with a peripheral recess and an anvil with a projection.

The universal joint arrangements 42 and 43 are identical and, therefore, only the arrangement 42 will be described. This arrangement includes a member 78 which is pivotally secured about the axis 79 to a member 82 by means of outwardly projecting stubs 85 forming a part of the member 82. The member 82 includes two further stubs 86 which pivotally secure the member 82 to a central member 87. The central member 87 is pivotally secured to the member 90 by means of the stubs 91 thereof. Member 90 is pivotally secured to the member 92 by the stubs 95. In certain situations, it will be desirable to provide means for preventing rotation of the member 78 relative to the shaft 30 but for permitting longitudinal axial movement of the member 78 relative to shaft 30. Similar means may be desirable for connecting shaft 45 and member 92. Such means permit a greater amount of horizontal adjustment of the adjustable support 54.

The anvil support 54 can be horizontally adjusted to various positions by rotating the screw 100. The screw 100 is journalled for rotation within the side plate 17 and has its threaded portion 101 threadedly received through a projection 102 fixed to the adjustable anvil support 54. As can best be seen in FIG. 4, the element 102 projects through a slot 105 which extends horizontally so as to permit reciprocation of the element 102 with the adjustable anvil support 54. The forming wheel 47 is journalled within the bearing 106 which projects through a slot 107 in the front plate 20. The slot 107 also permits horizontal movement of the bearing 106 with the anvil support 54. It can be appreciated that rotation of the handle 110 on the screw 100 to any given position permits adjustment of the anvil support to a location which is appropriate for the spacing apart of the wires 70 on the capacitors 71. Because of the fact that the anvil 52 is fixedly mounted upon the anvil support 54 and because of the fact that the wheel 47 is rotatably mounted upon the anvil support, movement of the anvil support to a new location does not affect the spacing apart of the anvil and the wheel.

On each of the wheels 41 and 47, there is provided a pair of fingers 115 and 116. The fingers 115 are identical to fingers 116 and will be described as representative thereof. The wheel 41 has a pair of radially extending slots 117 therein. Each of the slots 117 extends from an inner wall 120 completely to the periphery 121 of the wheel. The slot 117, however, does not extend completely through the wheel all along its length because of the portion 122 of the wheel which bridges the slot. The portion 122 is formed at its radially inwardly facing surface 125 with a concave part-cylindrical shape and is formed at its radially outwardly facing surface 126 also with a concave part-cylindrical shape. The surfaces 120 and 125 act as limits for the movement of the finger 115.

In FIG. 3, the finger 115 is shown in its projected position. The finger is held yieldably in this projected position by means of a compression spring 127 which has its opposite ends received in sockets 130 and 131 in the finger 115 and the wheel 41, respectively. The radially outer end 132 of the finger is formed to the same shape as the periphery of the wheel 41, that is, it includes a projection 135 which can be co-extensive with the periphery of the wheel 41 by depressing the finger 115 to its most radially inward position. It should be mentioned that as regards the fingers 116, their outer periphery has a recess therein corresponding in shape to the outer periphery of the wheel 47.

When it is desired to operate the present apparatus, the user picks up the capacitor 71 and, holding the flat circular body thereof between his thumb and forefinger, above and in front of the machine, moves the capacitor downwardly, keeping the body horizontal, and projects the wires 70 on the outside of the anvils 51 and 52 and down into the slot 65. Prior to so positioning the capacitor, the handle 110 should be rotated to a position wherein the anvils are properly spaced to match the horizontal spacing between the capacitor wires for accurate forming. The capacitor is then moved downwardly and held with the wires 70 against the outside surfaces 55 and 56 of the anvils with the wires 70 in a horizontal relationship and the operation of the motor 11 causes the blades 26 and 50 to shear off the ends of the wires 70 resulting in the configuration shown at 72 of FIG. 5.

Then, as the capacitor is moved further downwardly, still held between the thumb and forefinger, operation of the motor 11 also causes the wheels 41 and 47 to rotate clockwise and counterclockwise, respectively, until the fingers 115 and 116 engage the wires 70 and push the wires downwardly between the respective anvils and wheels for the forming operation. Because of the fact that the fingers 115 and 116 can be depressed radially inward in the wheels until their outer surfaces are co-extensive with the outer surfaces of the wheels, the wires 70 are pushed downwardly by the fingers all the way through the forming operation against the anvils. Thus, although the fingers are depressed almost completely by the anvils during the forming step, they always extend a sufficient amount beyond the outer peripheries of their respective wheels to force the wires past the anvils. The user can continue to hold the capacitor body between his thumb and forefinger during this forming step if he wishes, or he can let go of it as soon as the fingers 115 and 116 have engaged the wires, whichever is more convenient for him. The final result of the operation of the apparatus is shown as mentioned in FIG. 5.

From the above description, it will be evident that the present invention provides improved apparatus for forming component lead wires to proper length and shape. It will also be evident that the present invention provides an apparatus of the present nature which is easy and convenient to use, yet which produces a product of consistently high quality.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. An apparatus for forming and trimming projections, said apparatus comprising an anvil including a shear blade portion, a cutting blade mounted for movement toward and past said anvil for shearing cooperation with said anvil, a rotatably mounted wheel positioned adjacent said anvil, said anvil having a forming face shaped to cooperate with said wheel, a finger reciprocably mounted on said wheel and spring pressed radially outwardly beyond the periphery thereof, means for actuating said blade to trim off the end of a projecting wire, and means for rotating said wheel to cause said finger to engage the wire and force it between the wheel and anvil.

2. An apparatus for forming and trimming the projecting wires of electrical components, said apparatus comprising a pair of anvils, each including a shear blade portion, a pair of cutting blades mounted for horizontal movement inwardly toward and past said anvils for shearing cooperation with said anvils, a pair of rotatably mounted wheels with each wheel positioned adjacent a respective one of said anvils, each of said anvils having an outwardly facing forming face shaped to cooperate with a respective wheel, said forming faces being located below said cutting blade portions, fingers reciprocably mounted on said wheels and spring pressed radially outwardly beyond the peripheries of said wheels, means for actuating said blades to simultaneously move inwardly to trim off the ends of projecting wires, means for rotating said wheels to cause said fingers to engage the wires and force them between the wheels and anvils.

3. An apparatus for forming and trimming the projecting wires of electrical components, said apparatus comprising a frame having a vertically extending slot which diverges and opens at the top of said frame, a pair of anvils mounted on said frame and each including a shear blade portion, a pair of cutting blades mounted on said frame for horizontal movement inwardly toward and past the diverging portions of said slot and said anvils for shearing cooperation with said anvils, a pair of wheels each rotatably mounted on said frame on opposite sides of said slot with each wheel adjacent a respective one of said anvils, each of said anvils having an outwardly facing forming face shaped to cooperate with a respective wheel, said forming faces being located below said cutting blades, fingers reciprocably mounted on said wheels and spring pressed radially outwardly beyond the peripheries of said wheels, means for actuating said blades to simultaneously move inwardly to trim off the ends of projecting wires, means for rotating said wheels to cause said fingers to engage the wires and force them between the wheels and anvils.

4. An apparatus for forming and trimming the projecting wires of electrical components, said apparatus comprising a frame, a support element slidably mounted on said frame for horizontal movement, said frame and said support element defining therebetween a vertically extending slot which diverges and opens at the top thereof, a pair of anvils one mounted on said frame and one mounted on said support element, a pair of cutting blades one mounted on asid frame and one mounted on said support element for horizontal movement inwardly toward and past the diverging portions of said slot and said anvils for shearing cooperation with said anvils, a pair of wheels one rotatably mounted on said frame and one rotatably mounted on said support element with each wheel adjacent a respective one of said anvils, each of said anvils having an outwardly facing forming face shaped to cooperate with a respective wheel, said forming faces being located below said cutting blades, fingers reciprocably mounted on said wheels and spring pressed radially outwardly beyond the peripheries of said wheels, means for actuating said blades to simultaneously move inwardly to trim off the ends of projecting wires, means for rotating said wheels to cause said fingers to engage the wires and force them between the wheels and anvils.

5. An apparatus for forming and trimming the projecting wires of electrical components, said apparatus comprising a frame, a support element slidably mounted on said frame for horizontal movement, said frame and said support element defining therebetween a vertically extending slot which diverges and opens at the top thereof, a pair of anvils one mounted on said frame and the other mounted on said support element, a pair of cutting blades one mounted on said frame and the other mounted on said support element for horizontal movement inwardly toward one another and toward and past the diverging portions of said slot and said anvils for shearing cooperation with said anvils, a pair of wheels one rotatably mounted on said frame and the other rotatably mounted on said support element with each wheel adjacent a respective one of said anvils, each of said anvils having an outwardly facing forming face shaped to cooperate with a respective wheel, said forming faces being located below said cutting blades, fingers reciprocably mounted on said wheels and spring pressed radially outwardly beyond the peripheries of said wheels, a first shaft rotatably mounted on said frame, an eccentric secured to said first shaft and operatively engaging said one cutting blade for reciprocation thereof, a second shaft rotatably mounted on said frame and fixed to said one wheel for rotation thereof, a third shaft and a fourth shaft rotatably mounted on said frame, gearing positively connecting said shafts for rotation, a universal joint connecting said third shaft and said other wheel, a further shaft rotatably mounted on said support element, an eccentric secured to said further shaft and operatively engaging said other cutting blade for reciprocation thereof, a universal joint connecting said fourth shaft and said further shaft, and drive means for rotating said first shaft for activating said blades to simultaneously move inwardly to trim off the ends of projecting wires and for rotating said wheels to cause said fingers to engage the wires and force them between the wheels and anvils.

References Cited
UNITED STATES PATENTS

| | | | |
|---|---|---|---|
| 3,020,936 | 2/1962 | Bracci | 140—71 |
| 3,047,044 | 7/1962 | Pratt. | |
| 3,147,799 | 9/1964 | Brown | 140—105 |
| 3,193,171 | 7/1965 | Johnson et al. | 140—105 |
| 3,209,792 | 10/1965 | Nowell et al. | 140—105 |

CHARLES W. LANHAM, *Primary Examiner.*

E. M. COMBS, *Assistant Examiner.*